(12) United States Patent
Ishikawa et al.

(10) Patent No.: US 6,430,334 B1
(45) Date of Patent: Aug. 6, 2002

(54) SYSTEM AND METHOD FOR REFRACTING AND DEFLECTING LIGHT UTILIZING LIQUID CRYSTAL BARS AND BLOCKS

(75) Inventors: Akira Ishikawa, Royse City; Takashi Kanatake, Dallas; Wenhui "Bill" Mei, Richardson, all of TX (US)

(73) Assignee: Ball Semiconductor, Inc., Allen, TX (US)

( * ) Notice: Subject to any disclaimer, the term of this patent is extended or adjusted under 35 U.S.C. 154(b) by 0 days.

(21) Appl. No.: 09/557,654

(22) Filed: Apr. 25, 2000

(51) Int. Cl.⁷ .............................. G02B 6/26; G02B 6/42
(52) U.S. Cl. .......................... 385/18; 385/16; 385/17
(58) Field of Search ............................. 385/18, 16–24; 349/113

(56) References Cited

U.S. PATENT DOCUMENTS 6,014,478 A * 1/2000 Spacth ..................... 385/18
6,160,928 A   12/2000 Schroder ................... 385/16
6,198,856 B1   3/2001 Schroder et al. ........... 385/17

* cited by examiner

Primary Examiner—Phan T. H. Palmer
(74) Attorney, Agent, or Firm—Haynes & Boone (57) ABSTRACT

A system and method of optical switching utilizing a reflection device, the switch is disclosed. The system can include: an optical transmission path having an optical transmission medium, an input-side end and a first and a second output-side end; a radiation source associated with said input-side end for emitting a primary optical signal being coupled into said transmission path; a reflection device with the ability to be turned on and off selectively for receiving the primary optical signal and converting the primary optical signal into a secondary, modulated optical signal being reflected and coupled back into the second output-side end when the reflection device is on and wherein the primary optical signal is coupled into the first output-side end when the reflection device is off. The optical switch can contain mirrors that turn on and off, or are fixed in place while the switch is movable.

27 Claims, 7 Drawing Sheets

SYSTEM AND METHOD FOR REFRACTING AND DEFLECTING LIGHT UTILIZING LIQUID CRYSTAL BARS AND BLOCKS

FIELD OF THE INVENTION

The present invention relates to an optical switch having an optical transmission path with an optical transmission medium, a radiation source associated with an input-side end of the optical transmission path for emitting a primary optical signal being coupled into the transmission path, and an optical switch between the input-side and an output-side end of the transmission path.

CROSS REFERENCE

U.S. Patent Ser. No. 09/558,965, filed herewith, entitled "System and Method for Refracting and Deflecting Light Utilizing Spherical Shaped Devices" is hereby incorporated by reference as if reproduced in its entirety.

BACKGROUND OF THE INVENTION

Known optical switches use two fiberoptical waveguides, specifically one fiber for an outgoing path and one fiber for a return path of the optical signal. In the switching operation, as a rule, the location of a suitably constructed reflector is changed in such a way that either it couples the light signal from one fiber into the other fiber, or it interrupts an already existing coupling of the light signal and/or redirects it into another fiber.

Figure 1:
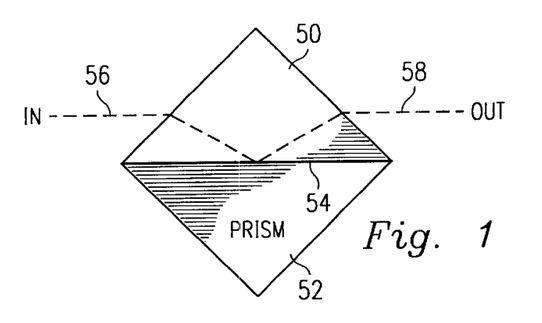
FIG. 1 illustrates a conventional optical switch with the mirror activated.

FIG. 1 shows a first prism 50 glued together with optical glue to a second prism 52. The optical glue forms a mirror 54 that reflects an incoming signal 56 into an outgoing signal path 58.

Figure 2:
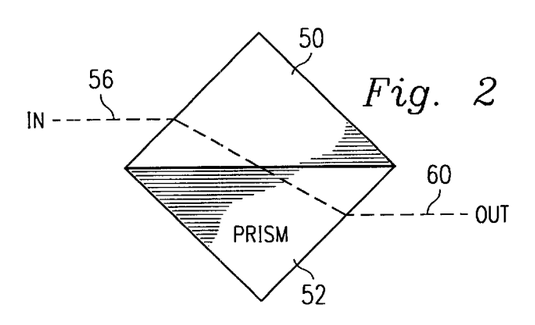
FIG. 2 illustrates a conventional optical switch with the mirror off.

FIG. 2 shows the same first prism 50 attached to the same second prism 52, but this embodiment does not have the mirror found in FIG. 1. Therefore, as the incoming signal 56 goes through the first prism 50, the signal does not get reflected, but passes through the second prism 52 into the second outgoing signal 60.

Although other embodiments exist for optical switches and many different methods exist to turn on and off the mirror between the two prisms, FIGS. 1 and 2 show the basis concepts of optical switching.

However, the current optical switches and methods have much room for improvement in cost, size and speed in order to enable the optical networks of the future.

SUMMARY OF THE INVENTION

The present invention, accordingly, provides an apparatus, system, and method for utilizing reflection bars in a new and improved optical switch. A system and method of optical switching utilizing a reflection device, the switch is disclosed. The system can include: an optical transmission path having an optical transmission medium, an input-side end and a first and a second output-side end; a radiation source associated with said input-side end for emitting a primary optical signal being coupled into said transmission path; a reflection device with the ability to be turned on and off selectively for receiving the primary optical signal and converting the primary optical signal into a secondary, modulated optical signal being reflected and coupled back into the second output-side end when the reflection device is on and wherein the primary optical signal is coupled into the first output-side end when the reflection device is off. The optical switch can contain mirrors that turn on and off, or are fixed in place while the switch is movable. Additionally, the optical switches can contain grating patterns to deflect an optical signal from its original path. The grating patterns can vary in design and pattern to deflect the optical signal in almost any direction, or to not let the optical signal continue. The optical switch can also include photo sensors along the exterior of the sphere or along the reflection device. The optical switch can also include an integrated circuits.

An object of the present invention is to provide optical switches that deflect, reflect and absorb optical signals utilizing a multitude of methods and systems.

Additionally, another object of the present invention is to provide intelligence to optical switches.

Further, another object of the present invention is to provide inexpensive methods and systems for optical switching in general.

Therefore, in accordance with the previous summary, objects, features and advantages of the present invention will become apparent to one skilled in the art from the subsequent description and the appended claims taken in conjunction with the accompanying drawings.

DESCRIPTION OF THE PREFERRED EMBODIMENT

The present invention can be described with several examples given below. It is understood, however, that the examples below are not necessarily limitations to the present invention, but are used to describe typical embodiments of operation.

Figure 3:
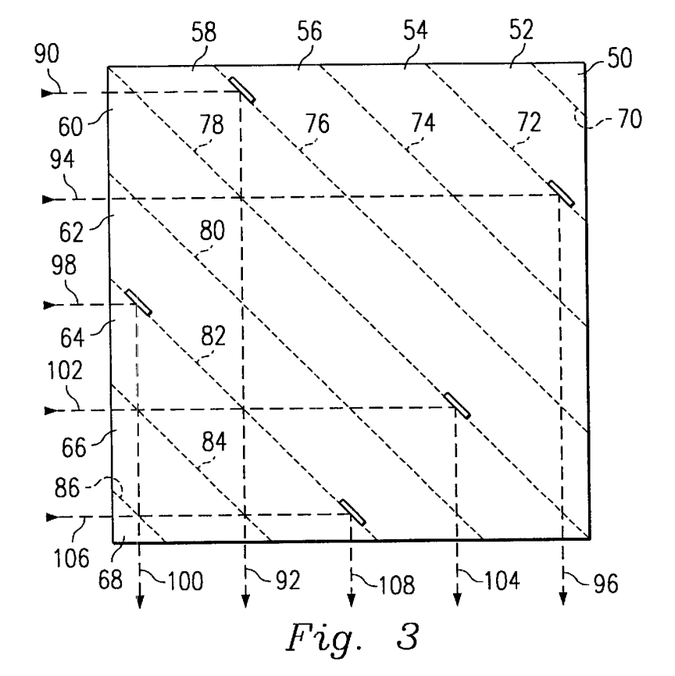
FIG. 3 is a diagram of one embodiment of the present invention.

Now referring to FIG. 3, an array of optical switches is shown. Layers of optical glass 50, 52, 54, 56, 58, 60, 62, 64, 66, and 68, along with layers of liquid crystal (LC) 70, 72, 74, 76, 78, 80, 82, 84 and 86 create the array of optical switches. Each layer of LC has the ability to turn on portions of the LC in order to redirect an optical signal onto another optical path.

For example, input signal 90 gets reflected at LC layer 76 onto output path 92. Similarly, input signal 94 gets reflected at LC layer 72 onto output path 96. Additionally, input signal 98 gets reflected at LC layer 82 onto output path 100. Likewise, input signal 102 gets reflected at LC layer 78 onto output path 104. Input signal 106 gets reflected at LC layer 82 onto output path 108.

Figure 4:
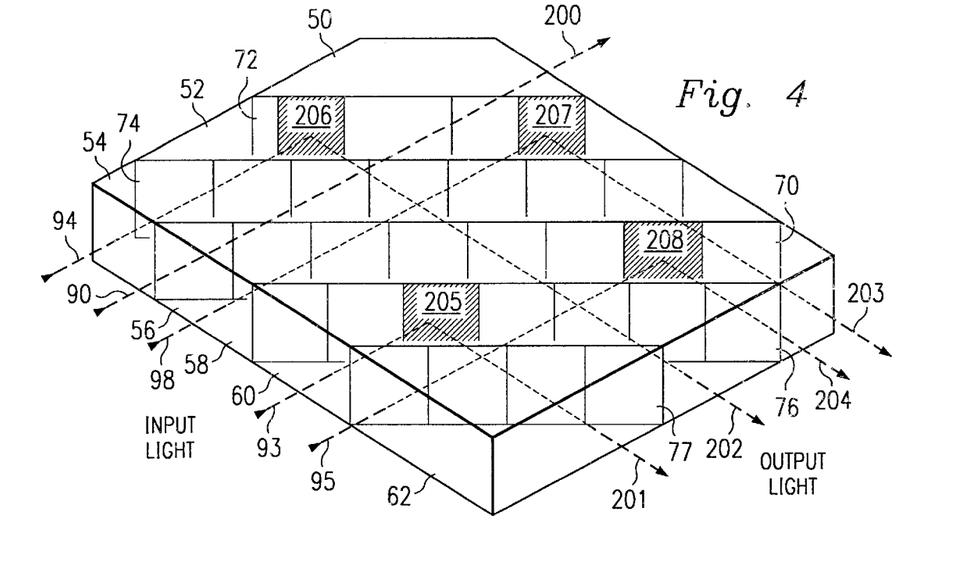
FIG. 4 is a three dimensional diagram of an embodiment of the present invention.

FIG. 4 shows a three dimensional example of the LC bar array shown in FIG. 3. Layers of optical glass 50, 52, 54, 56, 58, 60 and 62 are arranged with layers of LC 70, 72, 74, 76, 77 in between them. An example of an optical signal going straight through the array, is optical input signal 90 that exits as output signal 200. However, since a portion 206 of the LC layer 72 is on, the portion 206 reflects input signal 94 onto output signal 202. Likewise, input signal 98 gets reflected at a portion 208 of the LC layer 70 onto output signal 204. Additionally, input signal 93 gets reflected at a portion 205 of the LC layer 76 onto output signal 201. Further, input signal 95 gets reflected at a portion 207 of the LC layer 72 onto output signal 203.

Figure 5:
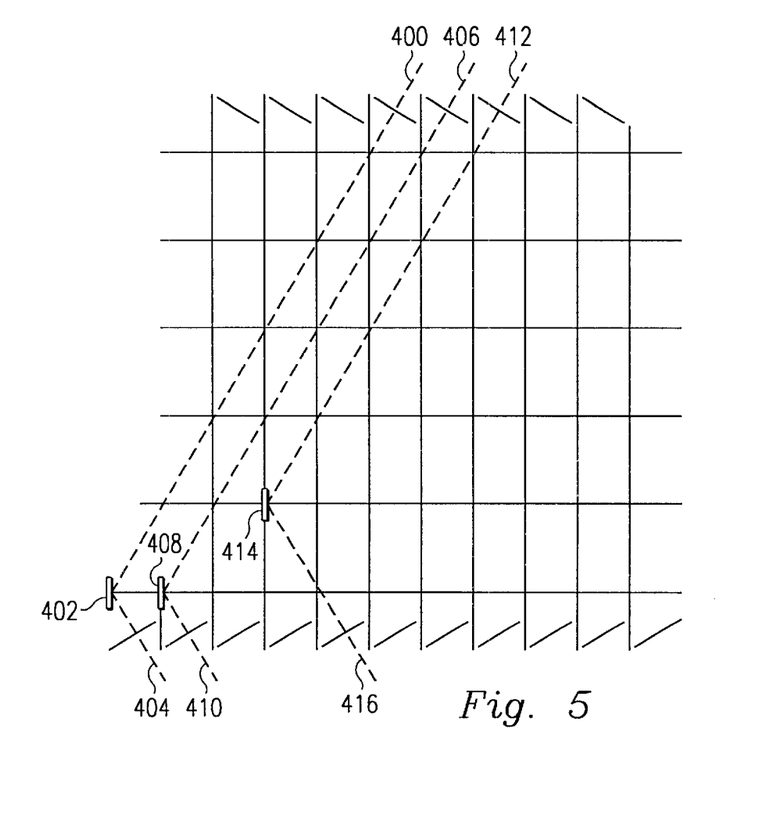
FIG. 5 is a diagram of another embodiment of the present invention.

FIG. 5 shows an example of a similar LC bar array, but at a thirty degree angle from the input signals. For example, input signal 400 gets reflected at a portion 402 of the LC layer into output signal 404. Likewise, input signal 406 gets reflected at a portion 408 of the LC layer into output signal 410. Similarly, input signal 412 gets reflected at a portion 414 of the LC layer into output signal 416.

Figure 6:
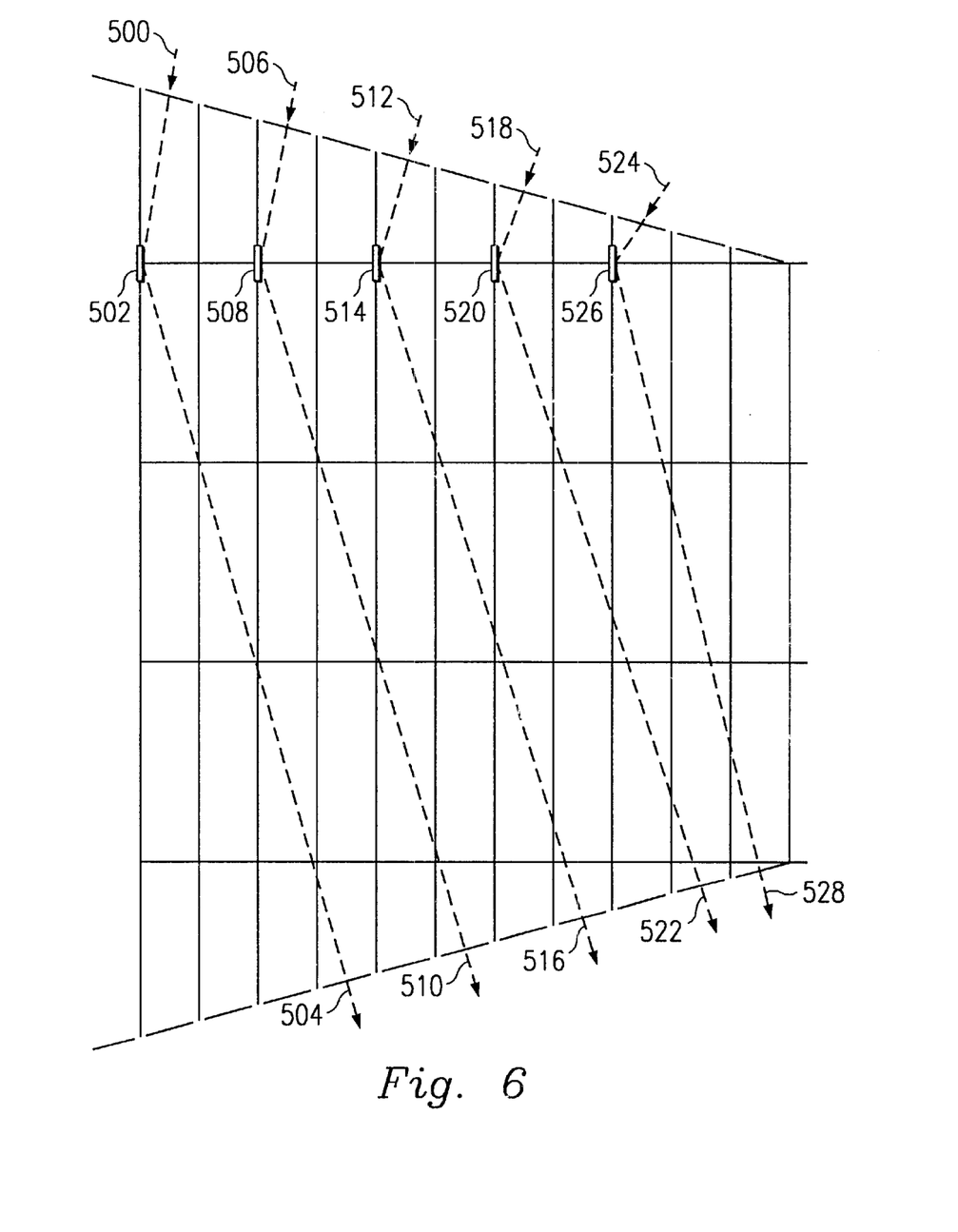
FIG. 6 is a diagram of yet another embodiment of the present invention.

FIG. 6 shows another example of a similar LC bar array, but at a fifteen degree angle from the input signals. For example, input signal 500 gets reflected at a portion 502 of the LC layer into output signal 504. Likewise, input signal 506 gets reflected at a portion 508 of the LC layer into output signal 510. Similarly, input signal 512 gets reflected at a portion 514 of the LC layer into output signal 516. Input signal 518 gets reflected at a portion 520 of the LC layer into output signal 522. Input signal 524 gets reflected at a portion 526 of the LC layer into output signal 528.

Figure 7:
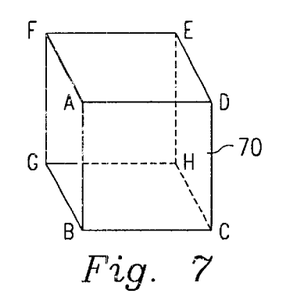
FIGS. 7–13 are diagrams of yet another embodiment of the present invention.

FIG. 7 illustrates another embodiment of the present invention. A cube 70 is shown with corners A-H. The cube is shown to illustrate an atom of another type of optical switch. Although this embodiment is envisioned to contain six mirrors intersecting each corner, FIGS. 8–13 illustrate the same cube with the different mirrors shown one at time to help clarify the embodiment.

This six mirrored cube would allow a signal to pass through the cube when no mirrors where on, and to be reflected onto the other sides of the cube perpendicular to the incoming signal when one of the mirrors is on.

Figure 8:
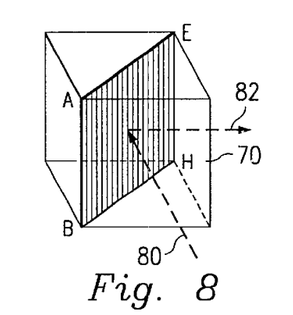

FIG. 8 shows a mirror with corners A, B, H and E. An optical signal coming into the cube 80 would be reflected in the direction of output signal 82 when this mirror is on.

Figure 9:
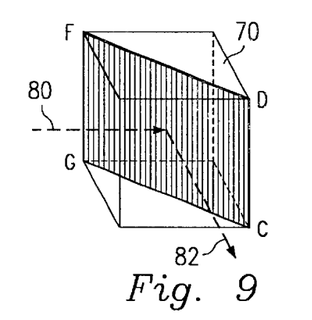

FIG. 9 shows a mirror with corners C, D, F and G. An optical signal coming into the cube 80 would be reflected in the direction of output signal 82 when this mirror is on.

Figure 10:
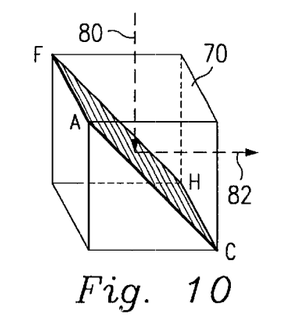

FIG. 10 shows a mirror with corners A, C, H and F. An optical signal coming into the cube 80 would be reflected in the direction of output signal 82 when this mirror is on.

Figure 11:
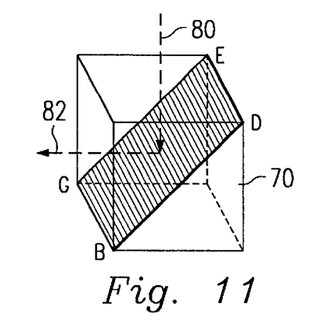

FIG. 11 shows a mirror with corners B, D, E and G. An optical signal coming into the cube 80 would be reflected in the direction of output signal 82 when this mirror is on.

Figure 12:
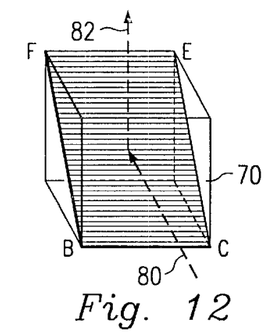

FIG. 12 shows a mirror with corners B, C, E and I. An optical signal coming into the cube 80 would be reflected in the direction of output signal 82 when this mirror is on.

Figure 13:
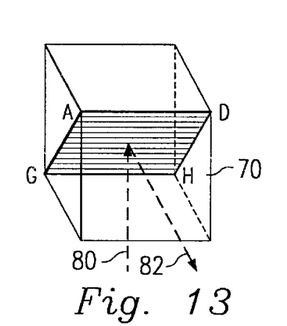

FIG. 13 shows a mirror with corners A, D, G and H. An optical signal coming into the cube 80 would be reflected in the direction of output signal 82 when this mirror is on.

Figure 14:
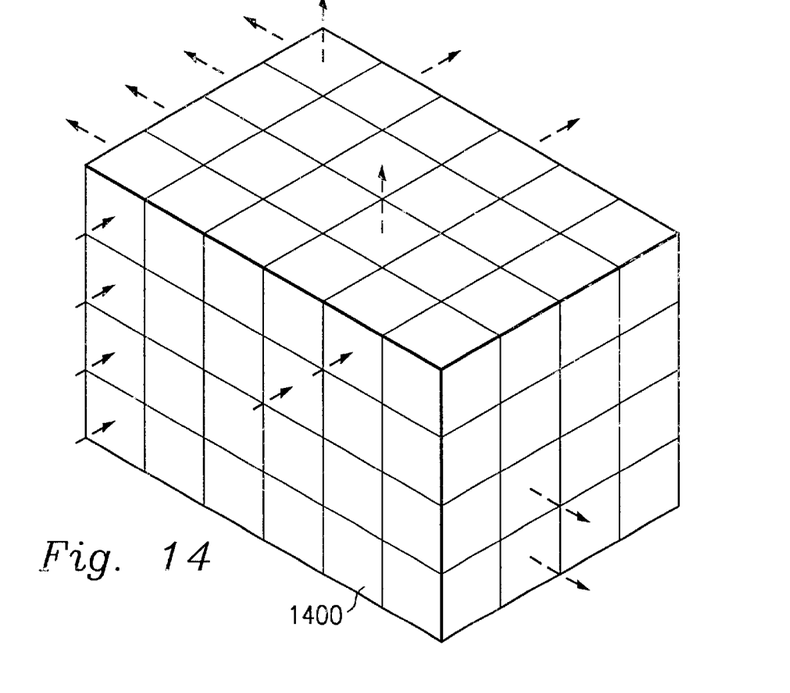
FIG. 14 is a diagram of exchanger composed of the atoms within FIG. 7.

FIG. 14 shows a set of the cube atoms composing an exchanger 1400 that will allow multiple optical signals to be redirected into the sides of the exchanger perpendicular to the incoming signal when a mirror is on within a cube in the path of the signal or allow the incoming signal to pass straight through the exchanger when the signal does not get interrupted.

Figure 15:
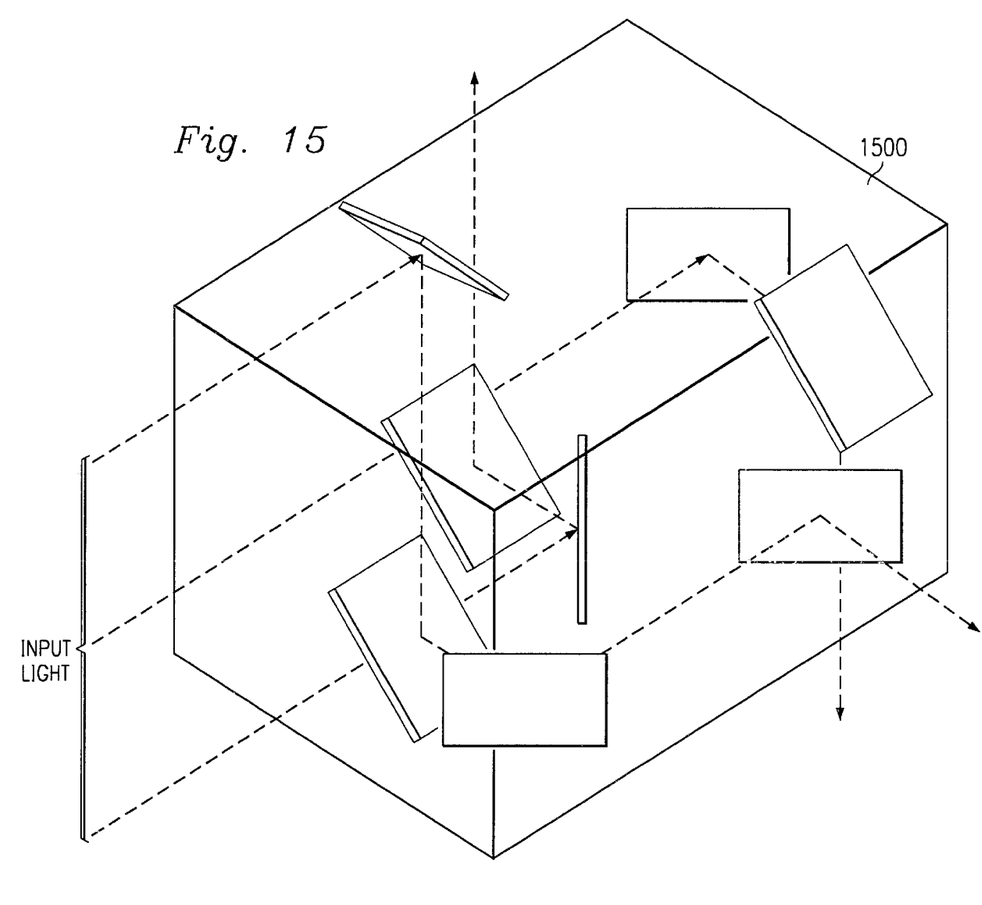
FIG. 15 is a diagram of alternative embodiment to the atom in FIGS. 7–13.

FIG. 15 illustrates another embodiment that is alternative to the cube with six mirrors described above. This unit 1500 is comprised of a series of mirrors within the atom designed to reflect the incoming signal out each side perpendicular to the incoming signal.

Figure 16:
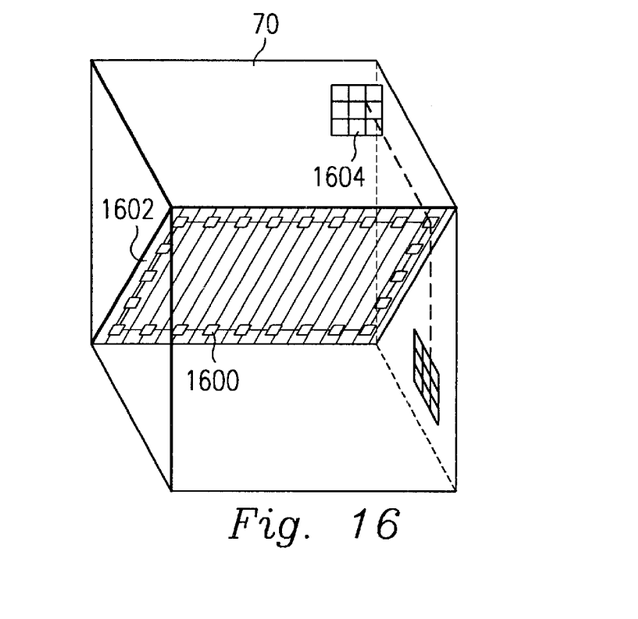
FIG. 16 is a diagram of alternative embodiment to the atom in FIGS. 7–13.

FIG. 16 illustrates a cube 70 shown in FIGS. 7–13 with sensors 1600 on the mirror 1602 as well as integrated circuit 1604 on the sides of the cube 70. The sensors 1600 could gather all types of information on optical signals such as phase, amplitude, wavelength and rate. Additionally, the sensors 1600 could be used to read the optical signal for various functions such as error checking. With the combination the sensors 1600 and the integrated circuit 1604, the optical switch 70 becomes an intelligent optical switch that can be expanded to a multitude of functions.

Figure 17:
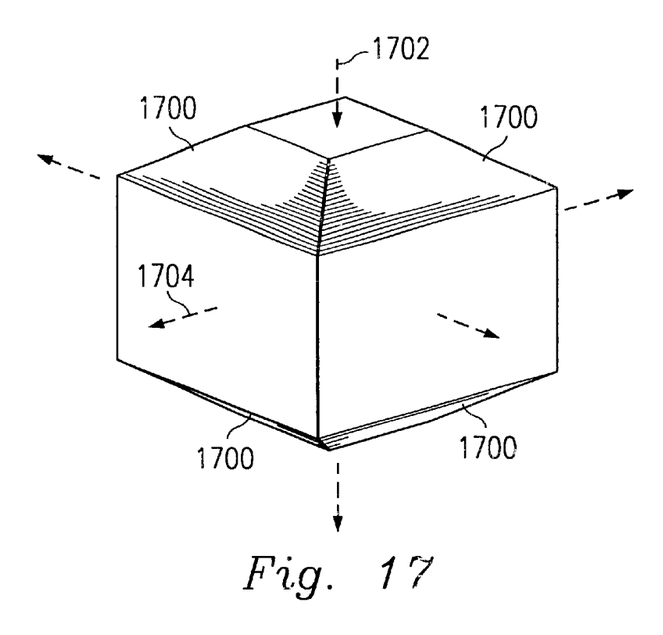
FIG. 17 is a diagram of alternative embodiment.

Another embodiment is illustrated in FIG. 17. This example is similar to the cube described above, but has the corners cut off and a layer of piezo electric material 1700 formed on the cutoffs. This object will also be called an atom in this and the next figure. In this example, when an incoming optical signal 1702, and the diagonally opposite corners of piezo electric material 1700 is activated, the index of refraction changes for the material and deflects the incoming optical signal 1702 into the outgoing optical signal 1704.

Figure 18:
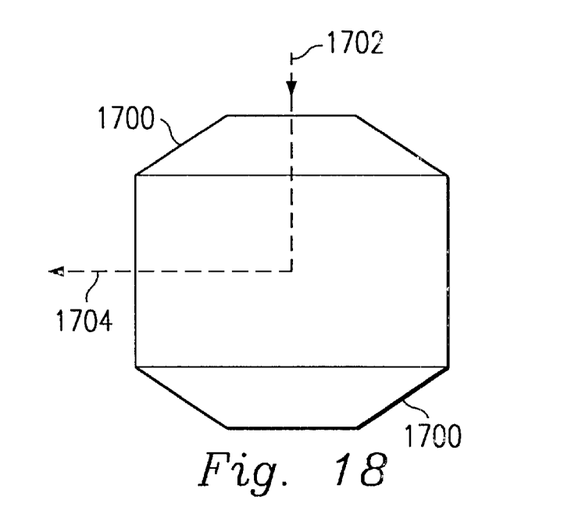
FIG. 18 is a cross sectional diagram of the alternative embodiment in FIG. 17.

FIG. 18 illustrates a cross sectional view the atom described in FIG. 17. The opposite piezo corners 1700 are activated to change the index of refraction of the atom and switch incoming optical signal 1702 into the outgoing optical signal 1704. Although an object similar to a cube was used for this example, the same principles could be applied to a sphere or other shaped object in order to change the index of refraction and switch the optical signal from one path to another. Accordingly, the output paths of the optical signal can be implemented in almost any direction from the incoming signal.

It is understood that several variations may be made in the foregoing. For example, the optical glass layer can be made of other materials used in conventional optics. Additionally, the LC bars can also be made of other materials that can reflect light and be turned on and off. Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An optical switch utilizing a reflection device, the switch comprising:
   an optical transmission path having an optical transmission medium, an input-side end and a first and a second output-side end;
   a radiation source associated with said input-side end for emitting a primary optical signal being coupled into said transmission path;
   a reflection device with the ability to be turned on and off selectively for receiving the primary optical signal and converting the primary optical signal into a secondary, modulated optical signal being reflected and coupled back into the second output-side end when the reflection device is on and wherein the primary optical signal is coupled into the first output-side end when the reflection device is off.

2. The optical switch of claim 1, wherein said optical transmission medium of said optical transmission path is a fiberoptical waveguide having a single fiber.

3. The optical switch of claim 1, wherein the switch is included within an array of similar switches within a plane.

4. The optical switch of claim 1, wherein the array is included within a plurality of similar arrays within at least a second plane.

5. The optical switch of claim 4, further including a temperature control device.

6. The optical switch of claim 1, further including at least one more reflection device.

7. The optical switch of claim 1, wherein the optical switch includes optical glass.

8. The optical switch of claim 1, wherein the optical switch includes acrylic glass.

9. The optical switch of claim 1, wherein the optical switch includes silicon.

10. The optical switch of claim 1, wherein the optical switch includes fused silicon.

11. The optical switch of claim 1, wherein the reflection device includes a liquid crystal layer.

12. The optical switch of claim 1, wherein the reflection device is composed of a material that changes index of refraction upon an electric charge.

13. The optical switch of claim 1, wherein the reflection device is composed of a material that changes index of refraction upon a magnetic field.

14. The optical switch of claim 1, wherein the reflection device is composed of a material that changes index of refraction upon an ultrasonic sound.

15. The optical switch of claim 1, wherein the reflection device is composed of a material that changes index of refraction upon a pressure variation.

16. The optical switch of claim 1, wherein the reflection device is composed of a material that changes index of refraction upon exposure to a radiation source.

17. The optical switch of claim 1, further including a plurality of photo sensors.

18. The optical switch of claim 1, further including an integrated circuit.

19. The optical switch of claim 1, further including five additional reflection devices.

20. The optical switch of claim 1, further including a plurality of additional reflection devices designed to reflect the primary signal from one side of a cube into a set of four perpendicular faces of the cube.

21. The optical switch of claim 1, wherein the reflection device turns on and off.

22. The optical switch of claim 1, wherein the reflection device reflects the primary signal ninety degrees.

23. The optical switch of claim 1, wherein the reflection device reflects the primary signal forty five degrees.

24. The optical switch of claim 1, wherein the reflection device reflects the primary signal thirty degrees.

25. The optical switch of claim 1, wherein the reflection device reflects the primary signal fifteen degrees.

26. An optical switch utilizing a plurality of reflection devices, the switch comprising:
   an optical transmission path having an optical transmission medium, an input-side end and a first and a second output-side end;
   a radiation source associated with said input-side end for emitting a primary optical signal being coupled into said transmission path;
   a plurality of reflection devices with the ability to be turned on and off selectively for receiving the primary optical signal and converting the primary optical signal into a secondary, modulated optical signal being reflected and coupled back into the second output-side end when a subset of the plurality of reflection devices are on and wherein the primary optical signal is coupled into the first output-side end when the subset of reflection devices are off.

27. An optical switch utilizing a plurality of reflection devices, the switch comprising:
   an optical transmission path having an optical transmission medium, an input-side end and a first and a second output-side end;
   a radiation source associated with said input-side end for emitting a primary optical signal being coupled into said transmission path;
   a plurality of reflection devices with the ability to be turned on and off selectively for receiving the primary optical signal and converting the primary optical signal into a secondary, modulated optical signal being reflected and coupled back into the second output-side end when one of the plurality of reflection devices is on and wherein the primary optical signal is coupled into the first output-side end when the plurality of reflection devices are off.

* * * * *